United States Patent
Hammer et al.

(10) Patent No.: US 12,079,141 B2
(45) Date of Patent: *Sep. 3, 2024

(54) HARDWARE OFFLOADING FOR AN EMULATED IOMMU DEVICE

(71) Applicant: Red Hat, Inc., Raleigh, NC (US)

(72) Inventors: Gal Hammer, Ra'anana (IL); Marcel Apfelbaum, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,093

(22) Filed: Feb. 16, 2023

(65) Prior Publication Data

US 2023/0195650 A1     Jun. 22, 2023

Related U.S. Application Data

(63) Continuation of application No. 17/475,229, filed on Sep. 14, 2021, now Pat. No. 11,630,782.

(51) Int. Cl.
| | |
|---|---|
| *G06F 12/00* | (2006.01) |
| *G06F 9/455* | (2018.01) |
| *G06F 12/06* | (2006.01) |
| *G06F 12/1009* | (2016.01) |
| *G06F 12/1036* | (2016.01) |
| *G06F 12/1072* | (2016.01) |

(52) U.S. Cl.
CPC ...... *G06F 12/1036* (2013.01); *G06F 9/45558* (2013.01); *G06F 12/0646* (2013.01); *G06F 12/1009* (2013.01); *G06F 12/1072* (2013.01); *G06F 2009/45583* (2013.01)

(58) Field of Classification Search
CPC ............ G06F 12/1036; G06F 9/45558; G06F 12/0646; G06F 12/1009; G06F 12/1072; G06F 2009/45583
See application file for complete search history.

(56) References Cited

U.S. PATENT DOCUMENTS

| | | |
|---|---|---|
| 10,013,388 B1 | 7/2018 | Wang |
| 10,514,938 B2 | 12/2019 | Ramakrishnan Nair |
| 10,733,112 B2 | 8/2020 | Jiang |
| 2006/0259818 A1* | 11/2006 | Howell ............... G06F 11/1484 714/21 |
| 2016/0239323 A1 | 8/2016 | Tsirkin |

(Continued)

FOREIGN PATENT DOCUMENTS

WO     2019079960 A1     5/2019

OTHER PUBLICATIONS

Kun Tian, Yu Zhang, Luwei Kang, Yan Zhao, and Yaozu Dong. "coIOMMU: A Virtual IOMMU with Cooperative DMA Buffer Tracking for Efficient Memory Management in Direct I/O", Intel Corporation, Proceedings of the 2020 USENIX Annual Technical Conference (Jul. 15-17, 2020), cover page and pp. 479-492 (15 pages total).

(Continued)

*Primary Examiner* — Arvind Talukdar
(74) *Attorney, Agent, or Firm* — Womble Bond Dickinson (US) LLP (57) ABSTRACT

Disclosed is a method of managing memory of a virtual machine (VM), including providing a physical IOMMU device on a host, and performing a memory translation using the physical IOMMU device on the host.

20 Claims, 7 Drawing Sheets

(56) References Cited

U.S. PATENT DOCUMENTS

2017/0249106 A1    8/2017    Apfelbaum
2020/0125500 A1    4/2020    Guan et al.
2021/0406199 A1*  12/2021  Kounavis .............. G06F 12/063
2022/0197805 A1    6/2022    He

OTHER PUBLICATIONS

Gong Su. "cVM: Containerized Virtual Machine," 2020 IEEE 6th International Conference on Collaboration and Internet Computing (CIC), Dec. 1-3, 2020, IBM T.J. Watson Research Center, Yorktown Heights, NY, 7 pages.

Qian Xu, Rashmin Patel. "Chapter 11: Hardware Virtualization", located in "Data Plane Development Kit (DPDK): A Software Optimization Guide to the User Space-Based Network Applications" (2020) (1st ed.), edited by Zhu, H., CRC Press, Boca Raton, FL, pp. 219-227.

* cited by examiner

HARDWARE OFFLOADING FOR AN EMULATED IOMMU DEVICE

RELATED APPLICATIONS

This application is a continuation of U.S. patent application Ser. No. 17/475,229, filed on Sep. 14, 2021, which is herein incorporated by reference in its entirety.

TECHNICAL FIELD

Aspects of the present disclosure relate to virtual machines (VMs), and more particularly, to virtual memory management on VMs.

BACKGROUND

Like physical computing devices (e.g., servers, personal computers, etc.), virtual machines (VM) utilize peripheral component interconnect (PCI) (e.g., PCI Express) devices for various functions including network interfacing (i.e., using a network interface controller [NIC]) and other functions. VMs create virtual PCI devices that operate wholly in software and utilize physical VM memory and virtual VM memory space in order to service the memory requests of the virtual PCI devices. In order to properly service the memory requests of the PCI devices, the VM operates a virtual, or emulated, input-output memory management unit (IOMMU) to manage access to the VM memory. The virtual IOMMU device operating on the VM manages a VM memory translation table that is used by the VM to translate virtual VM memory addresses to physical VM memory addresses.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Current implementations of memory address translations for virtual machine (VM) created PCI devices utilize software that runs over the VM memory translation table to find the correct match and return a result. Unfortunately, the software translation is slow and doesn't utilize an existing physical hardware that can perform the same functionality faster. This can cause network and other processing latency issues for the PCI devices operating on the VM.

The present disclosure addresses the above-noted and other deficiencies by offloading the memory address translation processing to the physical input-output memory management unit (IOMMU) of the physical host on which the VM operates. By not performing the memory address translations in software, the VM performance, including network throughput, is improved.

In order to improve the network throughput and VM performance, a method of managing memory of a virtual machine (VM) is provided. In some instances, the method comprises receiving, at a physical input-output memory management unit (IOMMU) of a processing device executing the VM, a request from a VM IOMMU for VM memory address translation for a VM peripheral component interconnect (PCI) device. By sending the request for memory address translation to the physical IOMMU of the physical host (e.g., the server on which the processing device exists), the software resources on the VM are not overwhelmed by searching through a potentially large table for a translation lookup.

In some instances, the method further comprises determining, by the physical IOMMU, a corresponding VM memory address translation result based on the request as received and a memory translation table. Again, the hardware components of the physical IOMMU are capable of performing the memory translation much faster than the software-based translation that is performed on the VM. By freeing up software resources on the VM (i.e., not making the VM process the memory access translation for the created PCI device), the VM is able to process network traffic and other tasks much faster because it does not have to perform long memory lookups.

In some instances, the method further comprises transmitting, by the physical IOMMU to the VM IOMMU, the corresponding VM memory address translation result for servicing the request for VM memory address translation of the VM PCI device. Once the translation has occurred, the PCI device still needs to either read to or write from memory on the VM. The translation result is sent to the VM for servicing the memory access request.

Hereinafter, when referring to a PCI device, IOMMU driver, or IOMMU operated in the physical portion of a computing device (i.e., not a part of the VM), the component or memory translation table will be referred to as a "physical" component or "processing device memory translation table" to make it clear that the component is a part of the physical components of the computing device, as opposed to VM components created by or operated by the VM. Because there is physical and virtual memory for both the physical computing device and the VM, the term "physical" is not used to describe the computing device memory translation table or the memory. Instead, the memory translation table for the physical computing device is just termed "memory translation table" (e.g., see memory translation table 116 in FIG. 3B). If there is a memory translation table on the VM, it is termed "VM memory translation table."

Similarly, a VM created PCI device, IOMMU driver, IOMMU, and VM memory translation table are all referred to as "VM" devices (e.g., VM PCI Device, VM IOMMU, etc.) to indicate that they are operated by the VM and in the virtual domain. When referring to the VM or virtual components of the present disclosure, they may be referred to as the "virtual domain."

Figure 1:
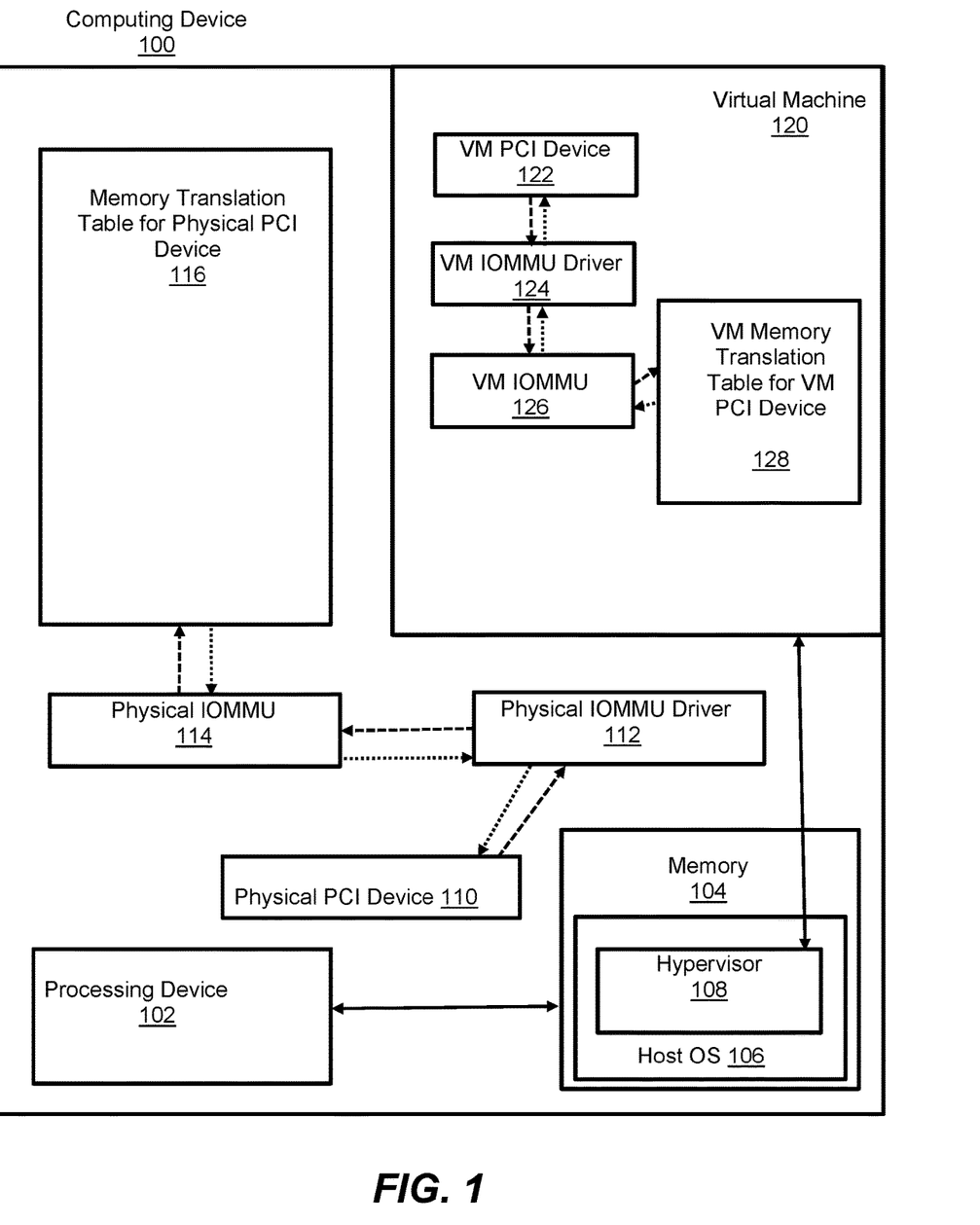
FIG. 1 is a block diagram that illustrates an example computing device operating a virtual machine (VM) according to some embodiments of the present disclosure.

FIG. 1 is a block diagram illustrating a computing device 100 including a physical processing device 102 (e.g., processors, central processing units (CPUs) operating a VM 120 (e.g., via hypervisor 108), where memory address translation for both the VM 120 and the processing device 102 is being performed separately in the virtual (i.e., on the VM 120) and physical (i.e., on the physical components associated with the processing device 102) domains. In some instances, the processing device 102 comprises one or more processors. The processing device 102 is operatively connected or coupled to a memory 104 which may be any suitable non-transitory computer readable medium storing executable computer instructions thereon (e.g., random access memory (e.g., RAM), storage devices (e.g., hard-disk drive (HDD), solid-state drive (SSD)), etc.).

In some embodiments, memory 104 may be a persistent storage that is capable of storing data. A persistent storage may be a local storage unit or a remote storage unit. Persistent storage may be a magnetic storage unit, optical storage unit, solid state storage unit, electronic storage unit (main memory), or any similar type of storage unit. Persistent storage may also be a monolithic/single device or a distributed set of devices. Memory 104 may be configured for long-term storage of data and may retain data between power on/off cycles of the computing device 100.

The computing device 100 may comprise any suitable type of computing device or machine that has a programmable processor including, for example, a server computer, desktop computer, laptop computer, tablet computer, smartphone, set-top box, etc. In some examples, the computing device 100 may comprise a single machine or may include multiple interconnected machines (e.g., multiple servers configured in a cluster). The computing device 100 may execute or include an operating system (OS) such as host OS 106 which may manage the execution of other components (e.g., hypervisor 108, software, applications, etc.) and/or may manage access to the hardware (e.g., processors, memory, storage devices etc.) of the computing device 100.

When a PCI device or PCI-E device (e.g., a graphics card, network interface controller (NIC), etc.) is connected to the computing system 100, the PCI device will require memory access to perform its operations.

Modern computing systems are designed to oversubscribe their physical memory (i.e., physical random access memory (RAM) and other memory types) space in order to perform many functions, including multi-threading as well as others. In order to perform this oversubscription, the computing systems add a layer of abstraction by using virtual memory which points to physical memory address spaces. The virtual memory space is typically smaller than the much larger physical memory space and therefore, there cannot be a one-to-one translation of virtual memory to physical memory. Instead, modern computers use memory address translation tables to convert from virtual memory addresses to physical memory addresses. IOMMUs are memory management systems that are designed to manage the translation of virtual memory addresses to physical memory addresses. IOMMUs are specifically used for PCI and PCI-E devices described above.

In other words, IOMMUs are used by modern computing systems to translate virtual memory addresses to physical memory addresses for servicing memory access requests by PCI devices.

As shown in FIG. 1, when the computing device 100 receives a physical PCI device 110 (i.e., a physical PCI device 110 is connected to a bus of the computing device 100), a memory translation table 116 is created for the particular physical PCI device 110 that is added to the computing device 100. When the physical PCI device 110 needs to access the memory 104 space of the processing device 102, the physical PCI device 110 will send a memory access request that is received by the physical IOMMU driver 112. The physical IOMMU driver 112 controls the physical IOMMU 108, which actually performs the lookup and translation using the memory translation table 116.

The physical IOMMU 114 is a hardware component and is capable of performing these translations using the memory translation table 116 very quickly compared to a translation performed in software.

The VM 120 works similarly to the physical domain side. The VM PCI device 122 is a virtual device that exists only in software. In other words, while the VM PCI device 122, such as, for example and without limitation, a virtual NIC, acts like a tangible, physical NIC inserted into a computing device, its actions and performance are carried out by software and not a physical hardware NIC. When a VM PCI device 122 is created, a software based VM IOMMU driver 124 has the VM memory translation table 128 created for the VM PCI device 122. When the VM PCI device 122 requests for memory access, the request is received by the VM IOMMU driver 124 which then informs the VM IOMMU 126 to perform the translation using the VM memory translation table 128 for the VM PCI device 122. However, as described above, this translation on the VM 120 is performed in software, which, is slow and can cause network throughput issues and other various latency issues.

Figure 2:
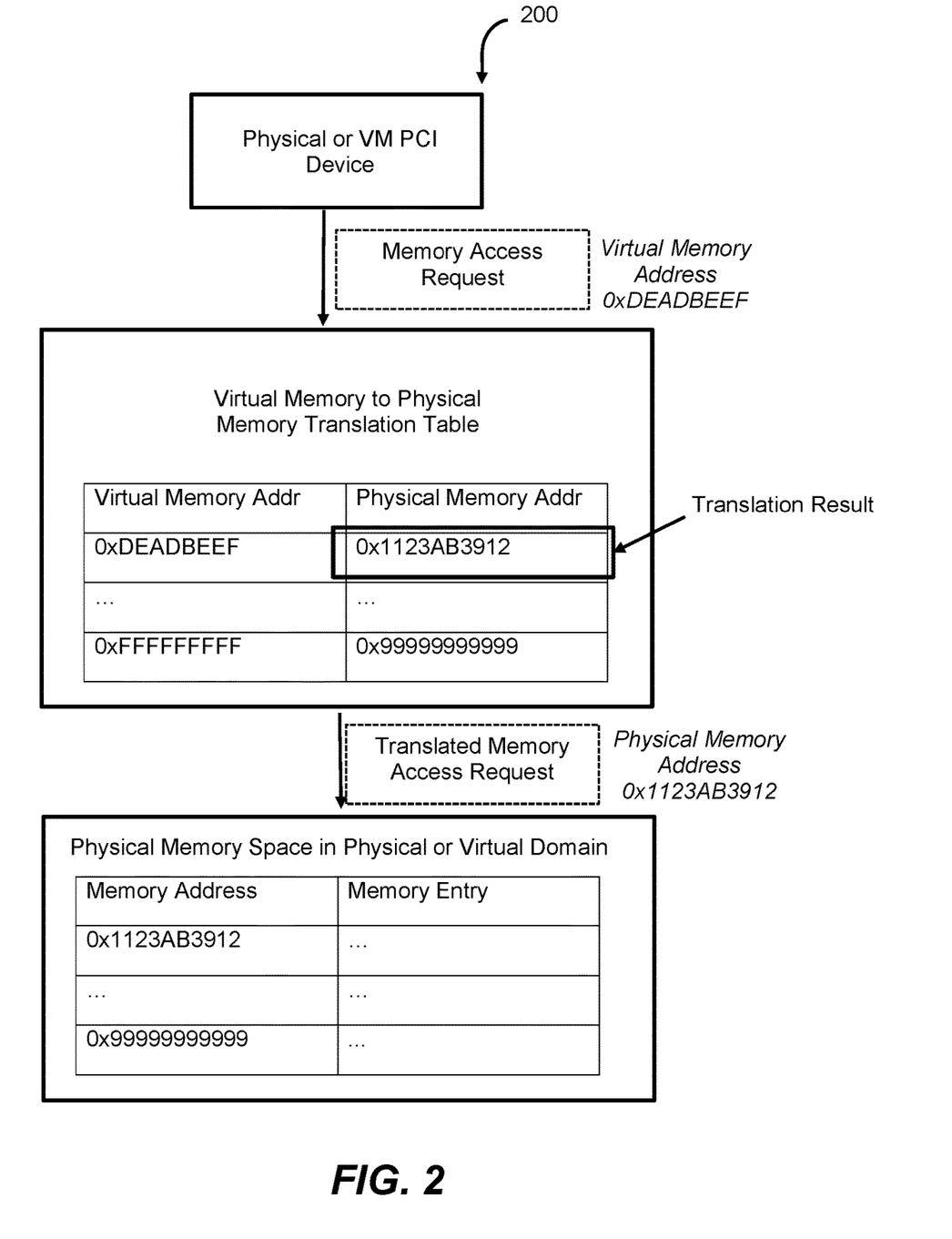
FIG. 2 is a block diagram illustrating an example memory address translation process of translating virtual memory to physical memory according to some embodiments of the present disclosure.

FIG. 2 is a block diagram illustrating the memory address translation process 200 of translating virtual memory to physical memory. When the physical or VM PCI device needs to access memory (i.e., either read access or write access) the PCI device will send a memory access request that includes the virtual memory address corresponding to the physical memory space it needs to access. Both the processing device and the VM have their own respective virtual memory and physical memory. In other words, the processing device has processing device virtual memory and processing device physical memory and the VM has VM virtual memory and VM physical memory. As described above, the virtual memory is used as a layer of abstraction over the physical memory and therefore, virtual memory addresses have to be translated to determine what physical memory address the virtual memory addresses correspond to.

In the example shown, the request from the physical or VM PCI device includes the virtual memory address 0xDEADBEEF. This request is processed by the IOMMU which uses the Processing Device or VM Virtual Memory to Physical Memory Translation table to translate the address to the corresponding physical memory address. In this example table, the requested virtual memory address is located on the first row and the corresponding physical memory address, or Translation Result, is 0x1123AB3912. In other words, the virtual memory address 0xDEADBEEF corresponds to the physical memory address 0x1123AB3912 in the physical memory of the device (whether it be the VM or the processing device).

The memory access process of the PCI device can then proceed to accessing the physical memory space using the physical memory address that was determined through the translation process above. As shown, the physical memory address 0x1123AB3912 is on the first row of the physical memory space and the memory entry can then either be read from or written to by the process controlling the PCI device.

Figure 3A:
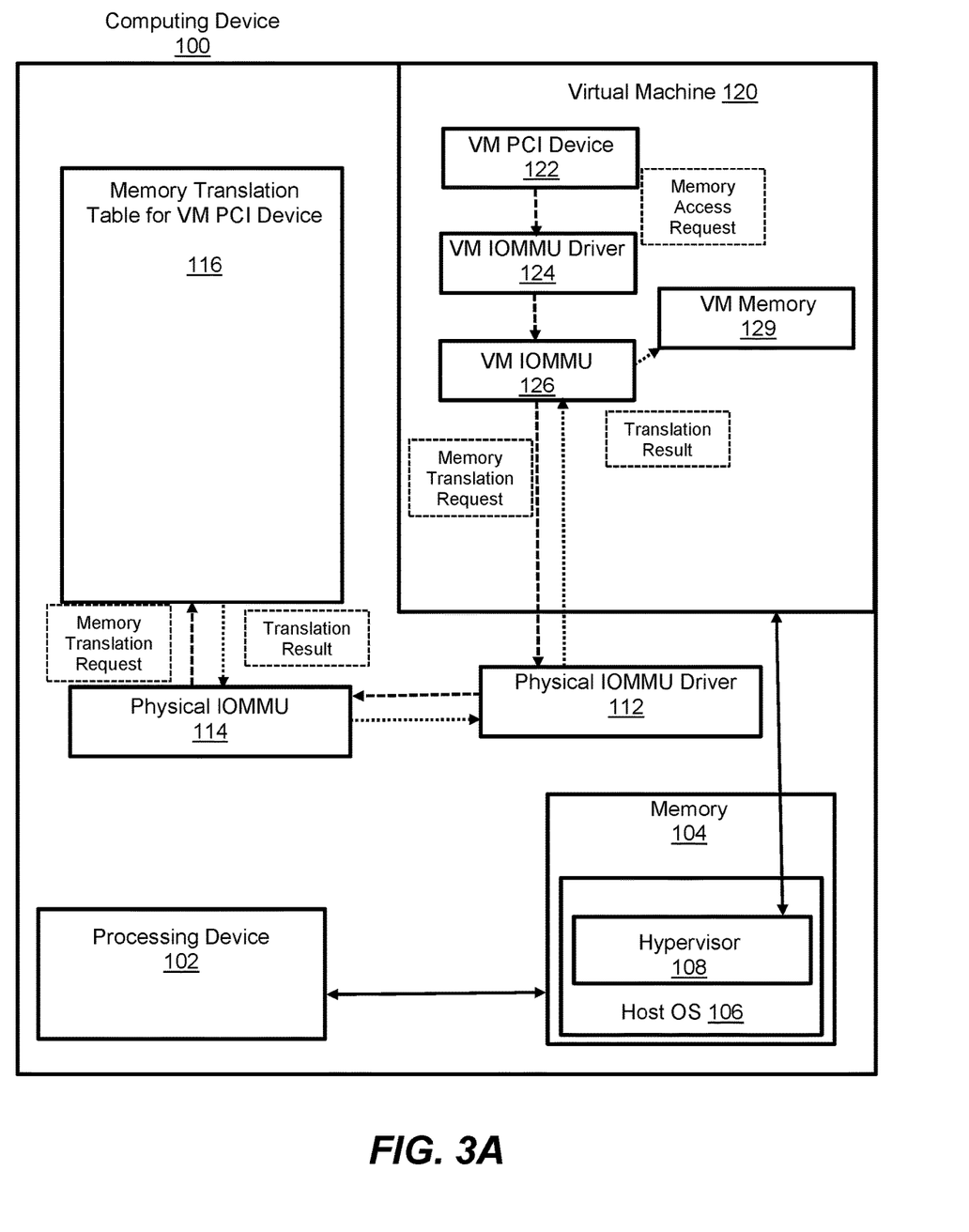
FIG. 3A and FIG. 3B are block diagrams illustrating example hardware offloading of memory translations for one PCI device of a VM to its physical host machine according to some embodiments of the present disclosure.

FIG. 3A illustrates a block diagram of the computing device 100 from FIG. 1, except here, the IOMMU procedures described above for the VM 120 are performed by the physical IOMMU 114 of the physical domain. FIG. 3A is an illustration of an example solution to the problems described above with current VM IOMMU memory translation. In some instances, the computing device 100 comprises a processing device 102 operatively coupled to a memory 104 that includes a host operating system (OS) 106 and a hypervisor 108. The hypervisor 108 is used for creating and controlling the VM 120.

Once the VM 120 is created and operating, a VM PCI device 122 can be created. As described above, the VM PCI device 122 is created in software and is a virtual device on the VM. In order to alleviate the latency issues associated with performing a software only memory translation table lookup, according to some examples of the present disclosure, instead of having the VM IOMMU 126 perform the memory translation table lookup, the physical IOMMU 114 of the computing device 100 (i.e., the physical domain IOMMU) maintains a memory translation table 116 for the VM PCI device 122, and performs the lookup. In some examples, the memory translation table 116 is stored in, or is a part of, the memory 104 operatively coupled to the processing device 102. In other examples, the memory translation table 116 is stored in, or is a part of, another memory separate from the memory 104.

As shown in FIG. 3A, after or while the VM PCI device 122 (e.g., a NIC, a graphics card (GPU), or storage controller generated by the VM) is created, a memory translation table 116 for the VM PCI device 122 is created. In some examples of the present disclosure, the VM IOMMU 124 is in communication with the physical IOMMU 114 and the VM IOMMU 124 configures the physical IOMMU 114 to generate the memory translation table 116 when or after the VM PCI device 122 is created. The memory translation table 116 is later populated with entries of translations from VM virtual memory addresses to corresponding VM physical memory addresses associated with the newly generated VM PCI device 122.

When the VM PCI device 122 needs to access VM memory space 129, whether it be for a memory write or read access, a memory access request is generated. As described above, the memory access request includes a VM virtual memory address associated with the VM PCI device that the VM PCI device needs to have translated into a corresponding VM physical memory address (see FIG. 2 and its description for a brief explanation of the process for translating VM virtual memory addresses into VM physical memory addresses). In some examples of the present disclosure, the memory access request is intercepted by the VM IOMMU driver 124 and a memory translation request is forwarded, via the VM IOMMU 126, to the physical IOMMU 114 for translating the VM virtual memory address to the VM physical memory address associated with the VM PCI device 122 and the particular memory access request generated.

The physical IOMMU driver 112 receives the memory translation request from the VM IOMMU 126 who then forwards the memory translation request to the physical IOMMU 114 for translation. After receiving the memory translation request, the physical IOMMU 114 then determines a corresponding VM memory address translation result based on the memory translation request as received and the memory translation table 116. The physical IOMMU 114 takes the VM virtual memory address from the memory translation request, searches the memory translation table 116 for the corresponding VM PCI device 122 from which the memory translation request is associated, and determines the translation result. As described herein, the translation result is a respective VM physical memory address to which the VM virtual memory address points.

As an example, the processing device memory translation table for the VM PCI device 116 can be a two column table. In the first column of the table 116, a list of VM virtual memory addresses can be populated. In the second column of the table 116, a list of corresponding VM physical memory addresses can be populated, where each respective VM physical memory entry can correspond to the VM virtual memory address found next to it in the first column. See FIG. 2 for an illustrative example.

After determining the memory address translation result, the physical IOMMU 114 transmits the memory address translation result (i.e., the respective VM physical memory address) to the VM IOMMU 126 for servicing the memory access request for the VM PCI device 122. In this regard, the VM IOMMU 126 takes the memory access request (e.g., memory read or memory write), uses the translation result to access the address space in VM memory 129 corresponding to the VM physical memory address of the translation result and performs the memory read or memory write action to the corresponding VM physical memory address space.

Using the example from FIG. 2, the VM physical memory address space 0x1123AB3912 is located in the VM memory 129 on the VM. At this address space, memory contents would either be read from or written to, based on the type of memory access request.

Figure 3B:
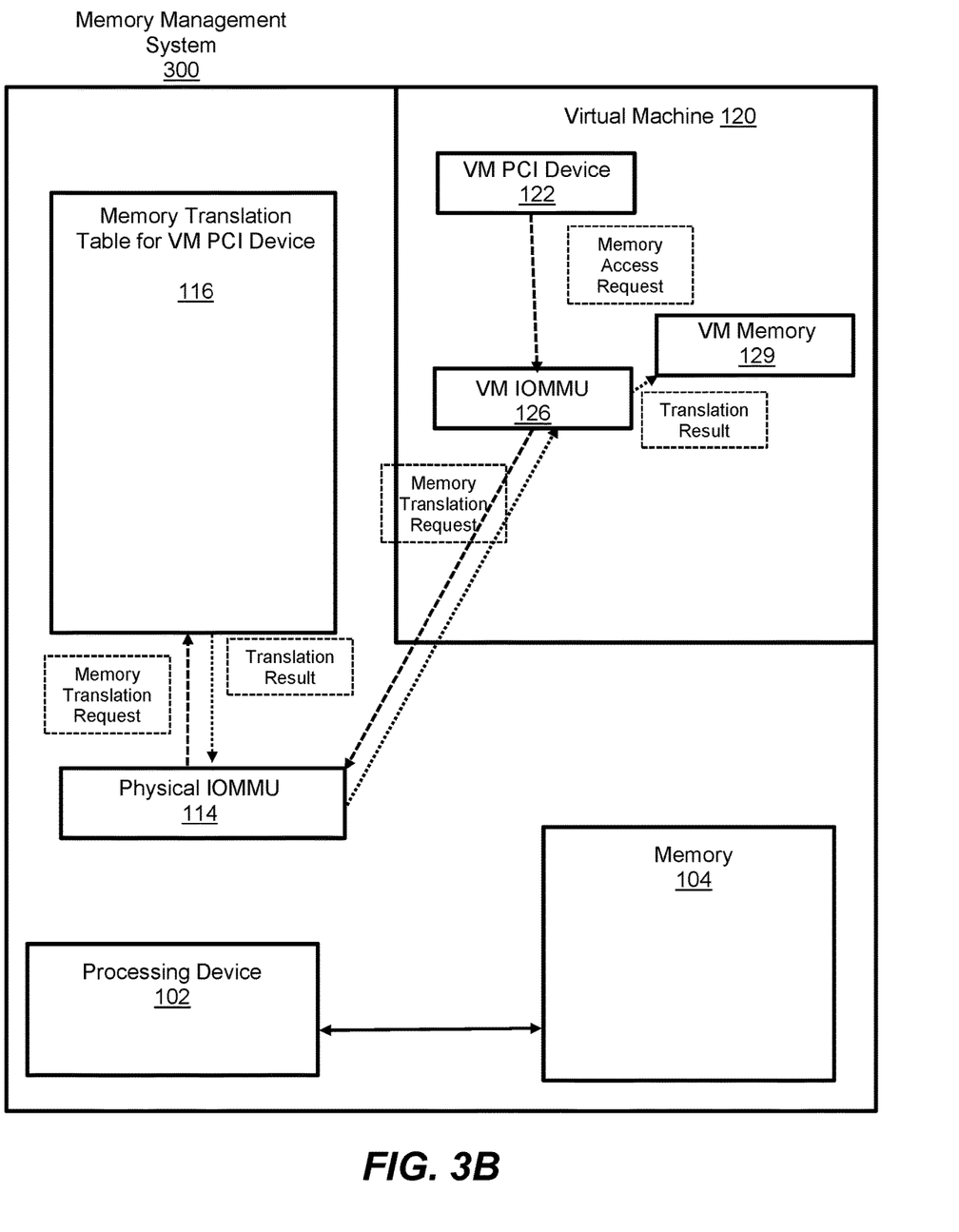

FIG. 3B illustrates a block diagram of a memory management system 300 according to some examples of the present disclosure. This diagram is very similar to the computing device 100 illustrated in FIG. 3A except here, the memory management system 300 includes memory 104 and a processing device 102 operatively coupled to the memory 104, where the memory 104 includes a host operating system 106 and a hypervisor 108 which control and manage the VM 120. The memory management system 300 further includes the physical IOMMU 114 which receives a request (i.e., a memory translation request) from the VM IOMMU 126 for VM memory address translation for the VM PCI device 122, which has transmitted a memory access request, requesting memory read or write access to the VM memory 129.

The physical IOMMU 114 then performs the same translation functions as described above with respect to FIG. 3A and FIG. 2 and transmit the VM memory address translation result back to the VM IOMMU 126 to service the request.

Figure 4:
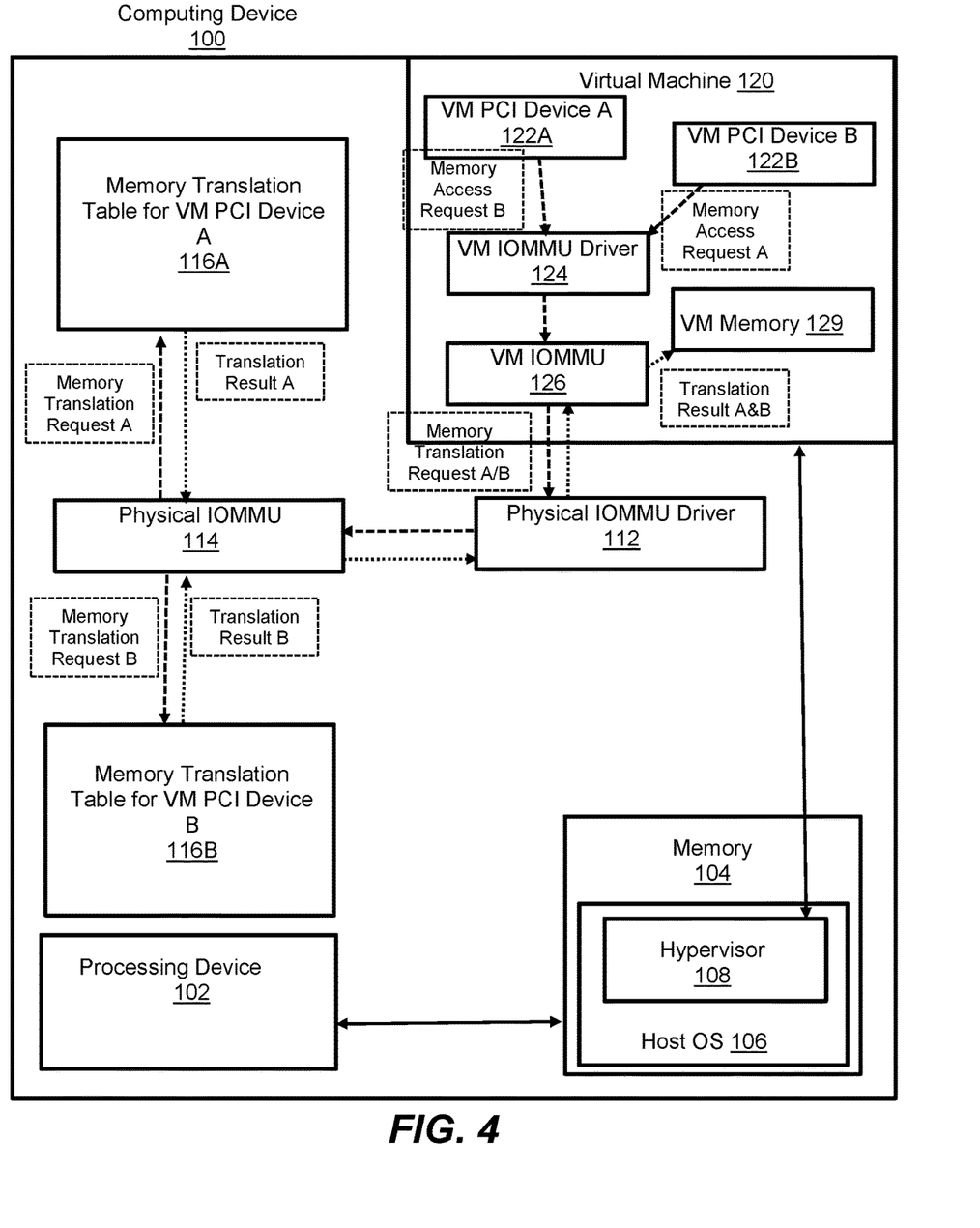
FIG. 4 is a block diagram illustrating example hardware offloading of memory translation for a plurality of PCI devices of a VM to its physical host machine according to some embodiments of the present disclosure.

FIG. 4 illustrates a block diagram of the computing device 100 from FIG. 3A, but with multiple VM PCI devices, VM PCI device A 122A and VM PCI device B 122B. As shown in FIG. 4, the physical IOMMU 114 is configured, by the VM IOMMU 124, to generate a separate and discrete processing device memory translation table for each VM PCI device that is created on the VM. For example and without limitation, the VM PCI device A 122A has a corresponding memory translation table 116A and the VM PCI device B 122B has a corresponding memory translation table 116B. In other words, for every VM PCI device created on the VM 120, there is a separate or discrete corresponding processing device memory translation table created.

In this configuration, the operation of the memory translations would be the same as described above, except for, in this case, the physical IOMMU 114 is responsible for managing which table to use based on the source of the memory translation request. The memory translations for the VM PCI device A 122A will be performed using the memory translation table 116A and the memory translations for the VM PCI device B 122B will be performed using the memory translation table 116B.

Figure 5:
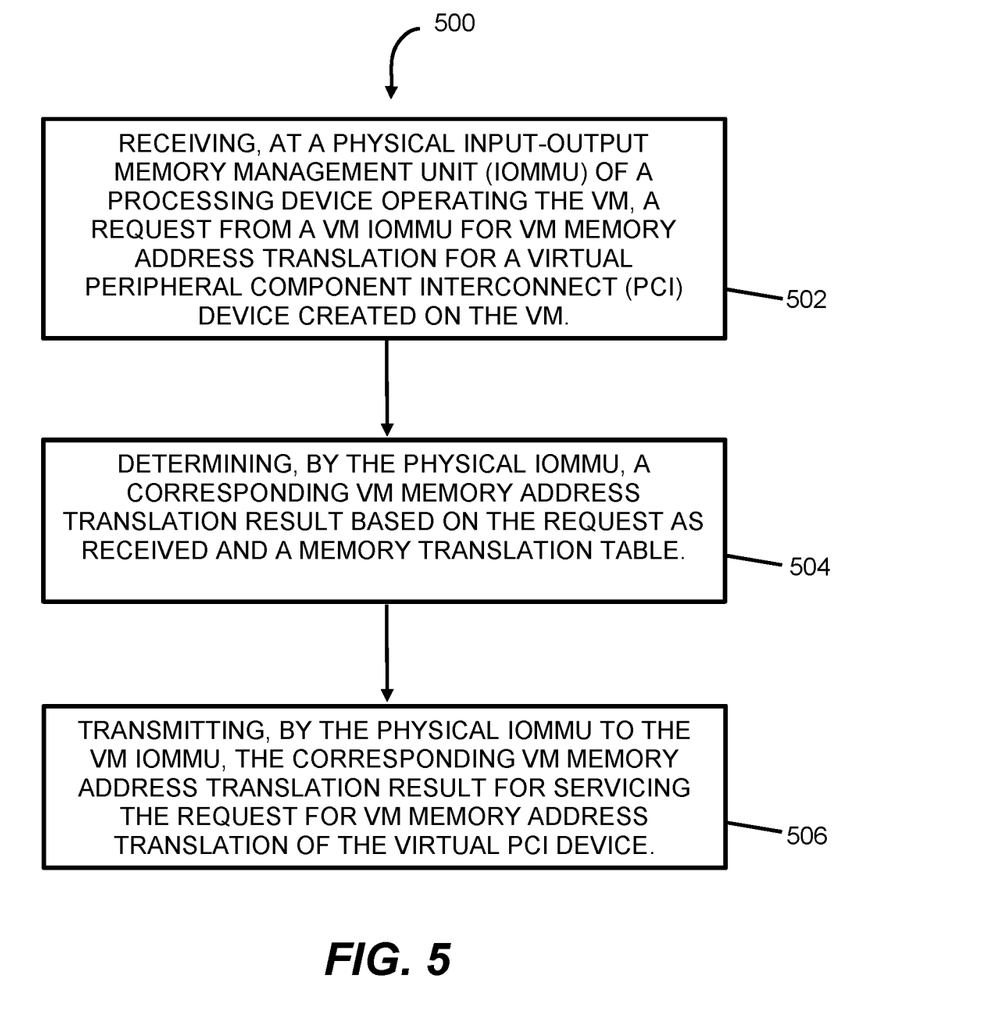
FIG. 5 is a flow diagram of an example method of managing memory of a VM according to some embodiments of the present disclosure.

FIG. 5 is a flow diagram of an example method 500 of managing memory of a VM according to some embodiments of the present disclosure. Step one 502 of the method 500 comprises receiving, at a physical input-output memory management unit (IOMMU) of a processing device operating the VM, a request from a VM IOMMU for VM memory address translation for a virtual peripheral component interconnect (PCI) device created on the VM. Step two 504 of the method 500 comprises determining, by the physical IOMMU, a corresponding VM memory address translation result based on the request as received and a memory translation table. Step three 506 of the method 500 comprises transmitting, by the physical IOMMU to the VM IOMMU, the corresponding VM memory address translation result for servicing the request for VM memory address translation of the virtual PCI device.

Figure 6:
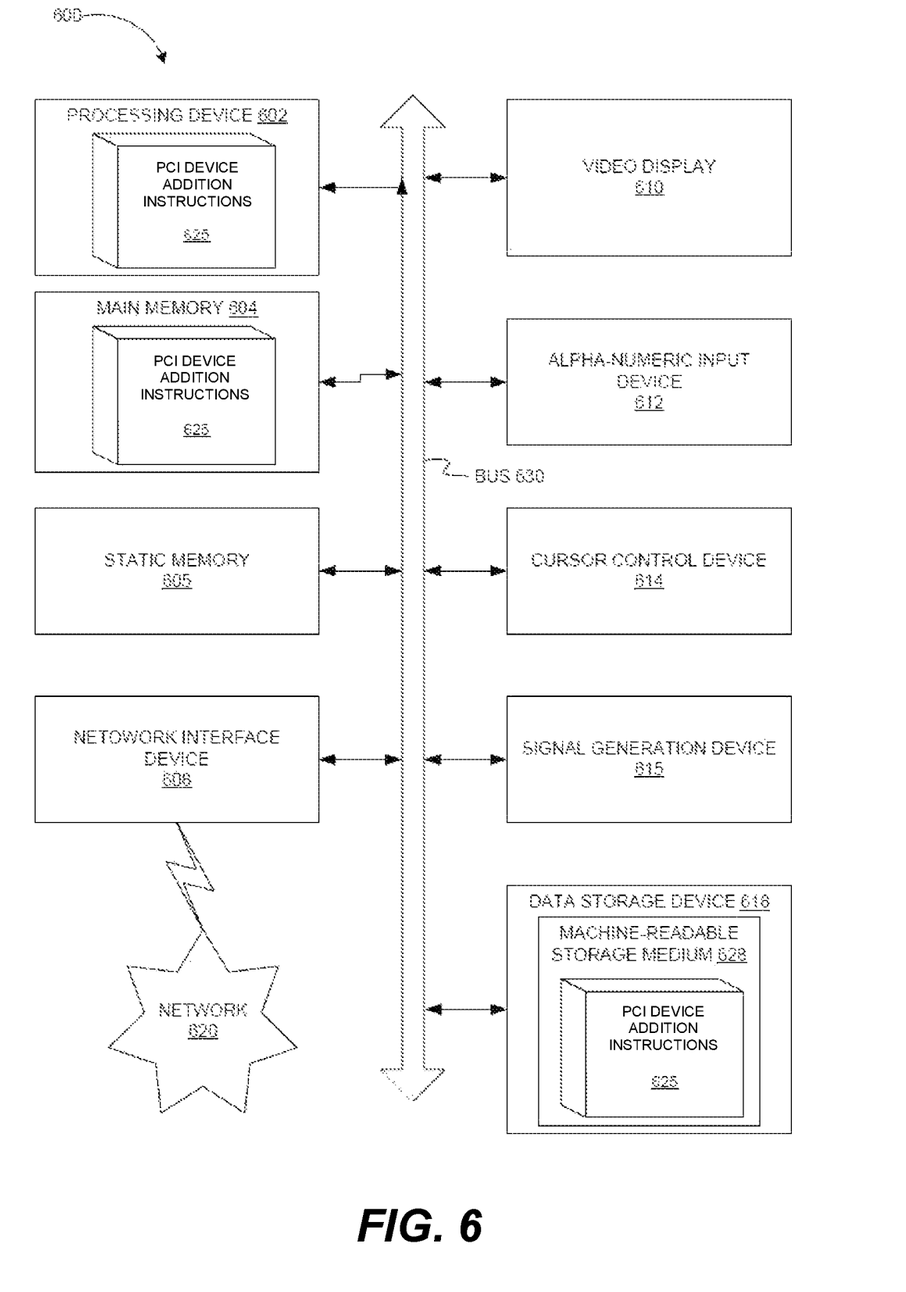
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device 600 may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of PCI device addition instructions 625, e.g., instructions for carrying out the operations described herein, in accordance with one or more aspects of the present disclosure. PCI device addition instructions 625 may also reside, completely or at least partially, within main memory 604 and/or within processing device 602 during execution thereof by computing device 600, main memory 604 and processing device 602 also constituting computer-readable media. The PCI device addition instructions 625 may further be transmitted or received over a network 620 via network interface device 608. Similar instructions for a VM PCI device can be handled and managed by the hypervisor for the VM.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of managing memory of a virtual machine (VM), the method comprising:
    providing a physical input-output memory management unit (IOMMU) device on a host of the VM, the physical IOMMU to perform memory translations for peripheral component interconnect (PCI) devices; and
    in response to receiving at the physical IOMMU device, a request from a VM IOMMU of the VM for VM memory address translation for a VM peripheral component interconnect (PCI) device, performing a memory translation using the physical IOMMU device to generate a VM memory address translation result based on the request as received and a memory translation table.

2. The method of claim 1, further comprising transmitting, by the physical IOMMU device to the VM IOMMU, the VM memory address translation result to service the request for VM memory address translation for the VM PCI device.

3. The method of claim 2, further comprising generating, by the physical IOMMU device, the memory translation table based on instructions from the VM IOMMU.

4. The method of claim 3, wherein the memory translation table comprises translations from VM virtual memory addresses to corresponding VM physical memory addresses.

5. The method of claim 3, wherein generating the memory translation table comprises configuring, by the VM IOMMU, the physical IOMMU to generate a discrete memory translation table for each VM PCI device created on the VM.

6. The method of claim 2, wherein the VM memory address translation result comprises a VM physical memory address corresponding to a VM virtual memory address indicated in the request for VM memory address translation for the VM PCI device.

7. The method of claim 2, wherein the VM PCI device comprises a network interface controller (NIC), a graphics card (GPU), or a storage controller generated by the VM.

8. A memory management system comprising:
    a memory;
    a processing device operatively coupled to the memory, the processing device to execute a virtual machine (VM), the VM including VM memory; and
    a physical input-output memory management unit (IOMMU) device operatively coupled to the processing device, wherein the physical IOMMU is to perform memory translations for peripheral component interconnect (PCI) devices, wherein the processing device is to:
        in response to receiving at the physical IOMMU device, a request from a VM IOMMU of the VM for VM memory address translation for a VM peripheral component interconnect (PCI) device, perform a memory translation using the physical IOMMU device to generate a VM memory address translation result based on the request as received and a memory translation table.

9. The memory management system of claim 8, wherein the physical IOMMU device is further to generate the memory translation table based on instructions from the VM IOMMU.

10. The memory management system of claim 9, wherein the memory translation table comprises translations from VM virtual memory addresses to corresponding VM physical memory addresses.

11. The memory management system of claim 9, wherein to generate the memory translation table, the physical IOMMU is to generate a discrete memory translation table for each VM PCI device created on the VM, wherein the physical IOMMU is configured to generate the discrete memory translation table for each VM PCI device created on the VM by the VM IOMMU.

12. The memory management system of claim 11, wherein the request is generated by the VM PCI device and intercepted by the VM IOMMU for transmission to the physical IOMMU, and
wherein the request is a VM memory access request comprising a VM virtual memory address associated with the VM PCI device to be translated into a corresponding VM physical memory address.

13. The memory management system of claim 12, wherein the VM memory address translation result comprises the corresponding VM physical memory address.

14. The memory management system of claim 11, wherein the VM PCI device comprises a network interface controller (NIC), a graphics card (GPU), or a storage controller generated by the VM.

15. A non-transitory computer-readable storage medium including instructions that, when executed by a processing device operating a virtual machine (VM), cause the processing device to:

provide a physical input-output memory management unit (IOMMU) device on a host of the VM, the physical IOMMU to perform memory translations for peripheral component interconnect (PCI) devices; and in response to receiving at the physical IOMMU device, a request from a VM IOMMU of the VM for VM memory address translation for a VM peripheral component interconnect (PCI) device, perform a memory translation using the physical IOMMU device to generate a VM memory address translation result based on the request as received and a memory translation table.

16. The non-transitory computer-readable storage medium of claim 15, wherein the processing device is further to transmit, by the physical IOMMU device to the VM IOMMU, the VM memory address translation result to service the request for VM memory address translation for the VM PCI device.

17. The non-transitory computer-readable storage medium of claim 15, wherein the processing device is further to generate, using the physical IOMMU, the memory translation table based on instructions from the VM IOMMU.

18. The non-transitory computer-readable storage medium of claim 17, wherein the memory translation table comprises translations from VM virtual memory addresses to corresponding VM physical memory addresses.

19. The non-transitory computer-readable storage medium of claim 16, wherein the VM IOMMU is to configure the physical IOMMU to generate a discrete memory translation table for each VM PCI device created on the VM.

20. The non-transitory computer-readable storage medium of claim 16, wherein the corresponding VM memory address translation result comprises a VM physical memory address corresponding to a VM virtual memory address indicated in the request for VM memory address translation for the VM PCI device.

\* \* \* \* \*